US007197486B2

(12) United States Patent
Asai et al.

(10) Patent No.: US 7,197,486 B2
(45) Date of Patent: Mar. 27, 2007

(54) OPTIMIZATION METHOD WITH CONSTRAINTS AND APPARATUS THEREFOR

(75) Inventors: Akira Asai, Kanagawa (JP); Shigeki Matsutani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 10/192,158

(22) Filed: Jul. 11, 2002

(65) Prior Publication Data

US 2003/0065689 A1   Apr. 3, 2003

(30) Foreign Application Priority Data

Jul. 11, 2001   (JP) ............................. 2001-210796

(51) Int. Cl.
*G06F 7/10* (2006.01)
(52) U.S. Cl. ..................... 706/19; 706/62; 706/919; 708/3; 708/8; 708/160; 708/200; 708/207
(58) Field of Classification Search ............... 706/12, 706/17, 19, 21, 46; 708/3, 4, 6, 8, 200, 207, 708/802, 804
See application file for complete search history.

(56) References Cited

U.S. PATENT DOCUMENTS 5,377,307 A * 12/1994 Hoskins et al. ............. 706/19
5,590,063 A * 12/1996 Golio et al. ................ 702/64

OTHER PUBLICATIONS

Yang Yaguang, "Optimization on Riemannian Manifold", Proceedings of the 38th Conference on Decision & Control, 1999.*
Edelman Alan et al., "Siam Journal on Matrix Analysis and Applications", 1998.*
Dehaene Jeroen et al., "Calculation of the Structured Singular Value with Gradient-Based Oprimization Algorithms on a Lie Group of Structured Unitary Matrices", IEEE Transactions on Automatic Controls, 1997.*
"Computational Methods in Optimization", by E. Polak, 1971, published by Academic Press.
"Optimization Techniques on Riemannian Manifolds", S. Smith Field Institute Communications, vol. 3 1994 pp. 113-136.
"The Geometry of Algorithms With Orthogonality Constraints", A Edelman, et al 1998 SIAM J. Matrix Anal. Appl., vol. 20, No. 2, pp. 303-353.

* cited by examiner

*Primary Examiner*—David Vincent
*Assistant Examiner*—Omar Fernandez
(74) *Attorney, Agent, or Firm*—Fitzpatrick, Cella, Harper & Scinto

(57) ABSTRACT

In a method for determining a minimum value of an optimization function under constraints given by equations, a set of points which satisfy the constraints is regarded as a Riemannian manifold within a finite-dimensional real-vector space, the Riemannian manifold is approached from an initial position within the real-vector space. An exponential map regarding a geodesic line equation with respect to a tangent vector on the Riemannian manifold ends at a finite order, an approximate geodesic line is generated as a one-dimensional orbit. An approximate parallel-translation is performed on the tangent vector on the Riemannian manifold and on the orbit generated in the orbit generating step by finite-order approximation of the exponential map regarding the parallel translation of the tangent vector. By repeating the above-described procedure from the position at which a minimum value is given until the minimum value on the orbit converges, the solution of the optimization problem with constraints is determined using a simple calculation procedure.

10 Claims, 6 Drawing Sheets

OPTIMIZATION METHOD WITH CONSTRAINTS AND APPARATUS THEREFOR

BACKGROUND OF THE INVENTION

1. Field of the Invention

The present invention relates to an optimization method for determining a minimum value of an optimization function under constraints given by equations, to an apparatus therefor, and to a program therefor.

2. Description of the Related Art

A problem of minimizing a real-valued function $E(r)$ under constraints specified by the equations is considered as, $$S_i(r)=0, i=1,\ldots,m, \quad (1)$$

where it is assumed that r is a n-dimensional real vector, that is:

$$r = \begin{pmatrix} r_1 \\ r_2 \\ \vdots \\ r_n \end{pmatrix}, r_1, r_2, \cdots, r_n \in R. \quad (2)$$

The problem of maximizing the real-valued function reduces to the above-described problem by inverting the sign of the function.

When there are no constraints, as a commonly used algorithm for solving such a problem, starting from an appropriate initial vector $r^{(0)}$, a point r at which the function $E(r)$ reaches a minimum is searched for by using a gradient vector $F=-\nabla E(r)$.

In recent years, the conjugate gradient method, including the Fletcher-Reeves method, the Polak-Ribiere method, etc., has also been used. The details of these algorithms are described in "Computational Methods in Optimization", by E. Polak, 1971, published by Academic Press. These methods have the advantages that, because a search direction orthogonal to the direction of a previously performed search is selected, the search is performed efficiently, and the algebraic properties of the Hestnes-Stiefel conjugate gradient method can be taken advantage of where the function $E(r)$ can be approximated by a second order. Accordingly, these methods are frequently used.

When constraints are added, since such simple algorithms do not succeed, various contrivances have been made. As representative examples, the penalty method and the multiplication method (the Lagrangian method of undetermined coefficients) are well known. These methods are described in detail in, for example, Iwanami Lectures on Applied Mathematics, "Optimization Methods", by Hiroshi FUJITA, Hiroshi KONNO, and Kunio TANABE, 1994, published by Iwanami Shoten.

In the penalty method, to express constraints, a penalty function $P(r)$ which becomes 0 when the constraint is satisfied and which becomes a very large number when the constraint is not satisfied is introduced so that a new function, $$\Omega(r)=E(r)+P(r) \quad (3)$$

is minimized. A specific form of the penalty function may be considered as, $$P(r) = \sum_{i=1}^{m} \omega_i S_i(r)^2, \quad (4)$$

where $\omega_i$ is a positive number and is adjusted to an appropriate value during the process of searching for a minimum value.

In the multiplication method, an undetermined multiplier $\lambda_i$ is introduced so that a new function of r and $\lambda_i$, $$\Omega(r, \lambda_i) = E(r) + \sum_{i=1}^{m} \lambda_i S_i(r), \quad (5)$$

is made stationary. The constraint is expressed as a stationary condition of $\Omega(r, \lambda_i)$ with respect to $\lambda_i$, $$\frac{\partial \Omega(r, \lambda_i)}{\partial \lambda_i} = 0. \quad (6)$$

In addition to these methods, an algorithm using a dynamic system in which a vector field is considered inside a space under consideration and the optimum point is an asymptotic solution of the vector field is also being investigated (described in the above-described "Optimization Methods" in the Iwanami Lectures on Applied Mathematics.)

In addition, recently, Smith et al. have proposed an algorithm in which an admissible set, that is, a set of points which satisfy constraints, is regarded as a Riemannian manifold, and based on that, a Newtonian method and a conjugate gradient method have been considered ("Optimization Techniques on Riemannian Manifolds", S. T. Smith, AMS, Fields Institute Communications, Vol. 3, 1994, pp. 113–136). Furthermore, regarding a case in which the admissible set is a Grassmann manifold or a Stiefel manifold, a more detailed algorithm has been proposed "The Geometry of Algorithms with Orthogonality Constraints", A. Edelman, T. A. Arias, S. T. Smith, SIAM J. Matrix Anal. Appl. Vol. 20, 1998, pp. 303–353). Since this algorithm becomes basically the same as the case in which there are no constraints, it has the feature that an additional variable or an adjustment parameter, such as those which appear in other methods, is unnecessary. This technique provides a new point of view with respect to optimization methods with constraints, and a wide range of applications to eigenvalue problems, etc., can be expected.

As described in the conventional methods, as an algorithm for an optimization problem under equation constraints, the multiplication method and the penalty method are widely used. The former becomes a saddle search problem, and the calculation algorithm becomes complex compared to an extremal-value search. The latter has a problem in that the selection of a penalty parameter must be contrived according to the problem.

Furthermore, in the algorithm using the above-described dynamic system, a contrivance for setting an appropriate dynamic system is required.

Furthermore, in the above-described algorithm of Smith et al., during the process of searching for the optimum point, a point is moved along a geodesic line on an admissible set. Smith et al. specifically form a solution of a geodesic line equation with regard to the cases of the Grassmann manifold and the Stiefel manifold. From the viewpoint of principles, if a point is moved in accordance with this solution, the point should stay within the admissible set. In practice, however, there is a problem in that, due to errors in numerical calculations, the point deviates from the admissible set. Furthermore, for a case in which the admissible set is not one of these manifolds, a mathematical expression of a specific solution of a geodesic line equation is not given.

SUMMARY OF THE INVENTION

Accordingly, an object of the present invention is to provide a method which is capable of determining a solution of an optimization problem with constraints using a simple procedure, and an apparatus therefor.

According to one aspect, the present invention which achieves this objective relates to a method for determining a minimum value of an optimization function under constraints given by equations, the method comprising the steps of: an approaching step of regarding a set of points which satisfy the constraints as a Riemannian manifold within a finite-dimensional real-vector space and of approaching the Riemannian manifold from an initial position within the real-vector space; an orbit generating step of truncating an exponential map with respect to a geodesic line equation for a tangent vector on the Riemannian manifold by a finite order and of generating an approximate geodesic line as a one-dimensional orbit obeying the truncated exponential map; and an approximate parallel-translation step of performing approximate parallel-translation on the tangent vector on the Riemannian manifold and on the orbit generated in the orbit generating step by finite-order approximation of the exponential map for the parallel translation of the tangent vector.

According to another aspect, the present invention which achieves this objective relates to an apparatus for determining a minimum value of an optimization function under constraints given by equations, the apparatus comprising: approaching means for regarding a set of points which satisfy the constraints as a Riemannian manifold within a finite-dimensional real-vector space and of approaching the Riemannian manifold from an initial position within the real-vector space; orbit generating means for truncating an exponential map regarding a geodesic line equation with respect to a tangent vector on the Riemannian manifold at a finite order and of generating an approximate geodesic line as a one-dimensional orbit obeying the truncated exponential map; and approximate parallel-translation means for performing approximate parallel-translation on the tangent vector on the Riemannian manifold and on the orbit generated in the orbit generating step by finite-order approximation of the exponential map regarding the parallel translation of the tangent vector.

According to still another aspect, the present invention which achieves this objective relates to a computer-readable program for determining a minimum value of an optimization function under constraints given by equations, the program comprising code for causing the computer to perform: an approaching step of regarding a set of points which satisfy the constraints as a Riemannian manifold within a finite-dimensional real-vector space and of approaching the Riemannian manifold from an initial position within the real-vector space; an orbit generating step of truncating an exponential map with respect to a geodesic line equation for a tangent vector on the Riemannian manifold by a finite order and of generating an approximate geodesic line as a one-dimensional orbit obeying the truncated exponential map; and an approximate parallel-translation step of performing approximate parallel-translation on the tangent vector on the Riemannian manifold and on the orbit generated in the orbit generating step by finite-order approximation of the exponential map with respect to the parallel translation of the tangent vector.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Figure 1:
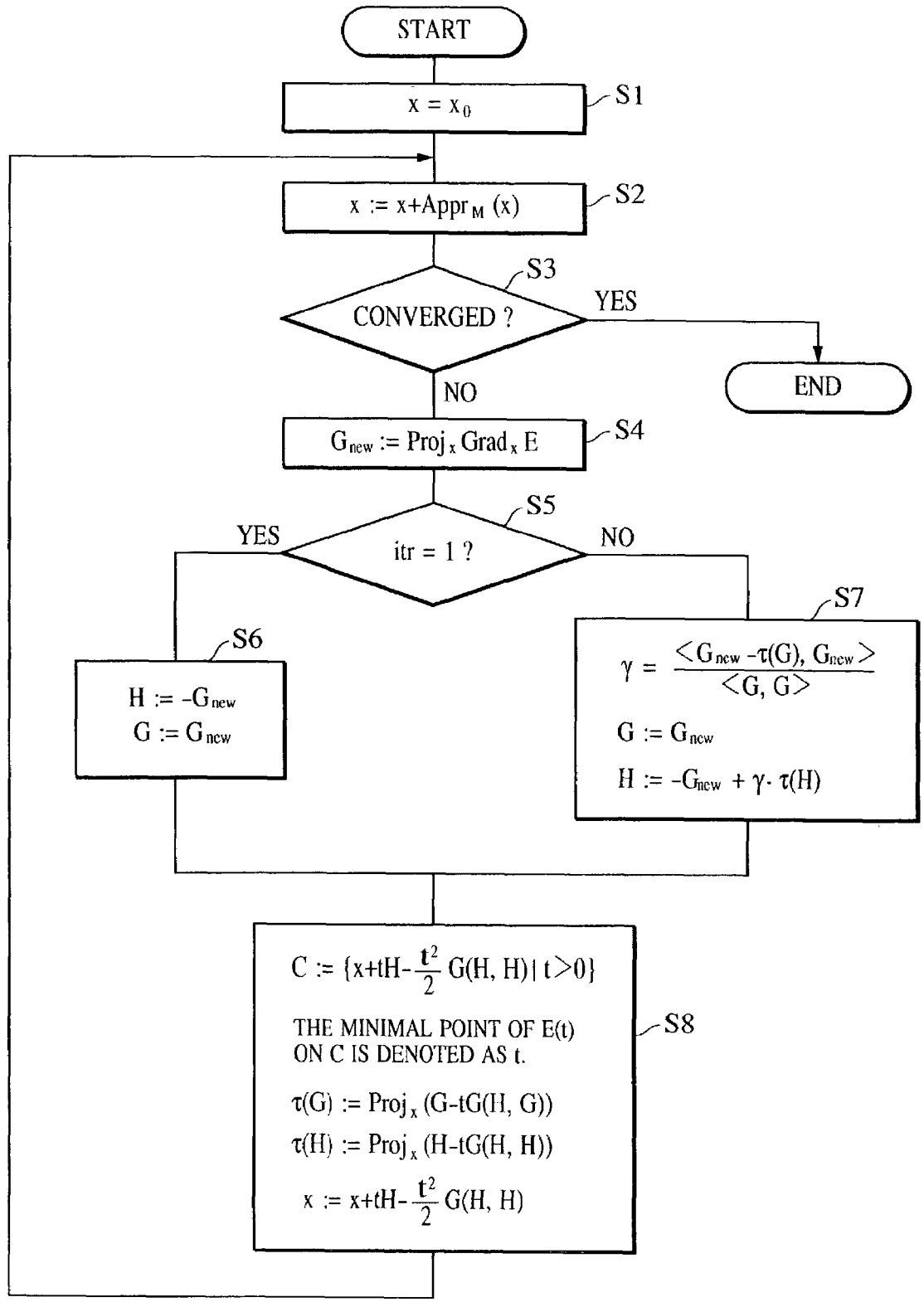
FIG. 1 is a flowchart showing a procedure for determining a solution of an optimization problem with constraints.

A preferred embodiment of the present invention will be described below in detail with reference to the attached drawings.

Here, a problem of determining a minimum value of an optimization function under constraints given by the above-described equations is formularized mathematically.

An n-dimensional real-vector space $R^n$ is considered, and $(e_i|i=1, \ldots, n)$ is assumed to be the base thereof. It is assumed that $(e_i|i=1, \ldots, n)$ is not necessarily orthogonal and takes, with respect to the inner product $<,>$, the value of $$b_{ij} = <e_i, e_j>, i,j=1, \ldots, n. \tag{7}$$

In practice, in an optimization problem which is a target in a finite element method, the base is not orthogonalized. Furthermore, it is assumed that a $C^\infty$-class function indicating m constraints ($1 \leq m \leq n$):

$$S^k: R^n \to R (k=1, \ldots, m), \tag{8}$$

and a $C^\infty$-class function (object function) bounded to the below:

$$E: R^n \to R, \tag{9}$$

are given. It is assumed that the constraints are given by $S^k(x)=0$, where $k=1, \ldots, m$ by using the above-described functions. A set which satisfies the constraints is called an "admissible set" and is written as:

$$M = \{x \in R^n | S^k(x)=0, \text{for } k=1, \ldots, m\}. \tag{10}$$

At this time, it is assumed that the regularity condition $$\text{rank} J(x) = m, \tag{11}$$

is satisfied in the neighborhood of M within $R^n$. Here, $J(x)$ is a Jacobian matrix, and the ki components thereof are defined on the basis of the following:

$$J_i^k(x) = \frac{\partial S^k(x)}{\partial x^i} \tag{12}$$

The Euclidean space $R^n$ can be regarded as a flat Riemannian manifold in which b is a metric. On the basis of the regularity of the constraints, M also becomes an m-dimensional sub-Riemannian-manifold in which b|M, obtained by restricting the metric of $R^n$ onto M, is a metric. Therefore, the optimization function with constraints in consideration is formularized as an optimization problem on a Riemannian manifold M: "determine x∈ M which minimizes E(x)".

Next, describing the manifold M by using vector analysis in $R^n$ is shown. As the coordinates for representing the points on an (n–m)-dimensional Riemannian manifold, a local coordinate ($\xi^i$|i=1, ..., n–m) can be used. Here, by using the fact that M is a submanifold of $R^n$, M is represented by using the positional vector of $R^n$. In order to distinguish this coordinate ($x^i$|i=1, ..., n–m) from a local coordinate in M, here, this is called an "extrinsic coordinate". From the viewpoint of numerical calculations, when an extrinsic coordinate is used, there is an advantage in that an efficient algorithm can be constructed by using the storage of algorithms on linear algebra. M, as a Riemannian manifold, and the properties in the vicinity thereof are described using the extrinsic coordinate.

Accordingly, here, a gradient, directional derivative, and Hessian in $R^n$ are defined as tools therefor. When the representations of vector analysis thereof in $R^n$ are used, it becomes possible to describe the quantities on M in a form which is independent of the selection of the extrinsic coordinate, thus offering good prospects.

In the following description, for subscripts regarding the extrinsic coordinates, the convention of Einstein is used. That is, when the same subscript appears two times, the sum from 1 to n will be taken as regard the subscript. Furthermore, ij components of an inverse matrix of a matrix ($b_{ij}$|i,j=1, ..., n) will be written as $b^{ij}$.

The gradient, the directional derivative, and the Hessian are defined below.

When x is a point within $R^n$ and f is a $C^{2\delta}$-class function on $R^n$, f: $R^n \to R$, with respect to an arbitrary vector $Z=Z^i e_i$, a vector Y uniquely exists so that it satisfies $$<Z, Y> = (df)_x(Z) \qquad (13)$$
$$= Z^i \frac{\partial f(x)}{\partial x^i}.$$

This vector Y is called the "gradient" of f in x, and is written as $Grad_x$ f. When the gradient is shown using components, the gradient becomes as follows:

$$Grad_x f := b^{ij} \frac{\partial f(x)}{\partial x^i} e_j. \qquad (14)$$

For the convenience of calculations, the following quantities are introduced:

$$F^k(x) := Grad_x S^k (k=1, \ldots, m),$$
$$Q^{kl}(x) := <F^k(x), F^l(x)> (k,l=1, \ldots, m), \qquad (15)$$

$Q_{kl}(x)$:=k,l components of an inverse matrix of matrix ($Q^{kl}(x)$|k,l=1, ..., m).

However, the existence of the matrix $Q_{kl}(x)$ depends on the regularity of the constraints as a matrix of $Q^{kl}(x)$, but the regularity of the constraints is ensured on the admissible set M and is also ensured in the vicinity of M within the $R^n$. In many physical examples, the function $S^k(x)$ is a sufficiently relaxed and blunt function, and M itself has a sufficiently relaxed and blunt shape. Therefore, within a region to be considered below, it may be considered that $Q_{kl}(x)$ exists.

Next, directional derivative is introduced. At the point x within $R^n$, the directional derivative $(Y \cdot Grad)_x f$ of the function f∈ $C^{2\delta}(R^n)$ along the vector $Y=Y^i e_i$ is defined as follows:

$$(Y \cdot Grad)_x f := df_x(Y) \qquad (16)$$
$$= <Y, Grad_x f>$$
$$= Y^i \frac{\partial f(x)}{\partial x^i}.$$

Furthermore, the directional derivative $(Y \cdot Grad)_x Z$ of the vector field $Z(x)=Z^i(x)e_i$ along the vector $Y=Y^i e_i$ is defined as follows:

$$(Y \cdot Grad)_x Z := [Y, Grad_x Z]^i e_i, \qquad (17)$$
$$[(Y \cdot Grad)_x Z]^i := (dz^i)_x(Y)$$
$$= <Y, Grad_x Z^i(x)>$$
$$= Y^j \frac{\partial Z^i(x)}{\partial x^j}.$$

It is a well-known fact that the definition of this directed differentiation does not depend on the selection of the extrinsic coordinate.

Next, the Hessian is defined. When x is a point within $R^n$ and f is a $C^\infty$-class function on $R^n$, f: $R^n \to R$, a real-valued function $Hess_x$ f, in which vectors $Y=Y^i e_i$ and $Z=Z^i e^i$ are arguments, is defined as, $$Hess_x f(Y, Z) = \frac{\partial^2 f(x)}{\partial x^i \partial x^j} Y^i Z^j. \qquad (18)$$

This function $Hess^x$ f is called "Hessian" of f at x.

Next, a description is given of an approaching algorithm onto the admissible set M by using the above-described definitions of the gradient, directed differentiation, and Hessian. x is assumed to be a point within $R^n$ and a point in the neighborhood of M. In the neighborhood system, a family $\{S^k\}$ of functions can be approximated as components of a vector space along the normal direction in which M is a zero point. That is, if a point y on M is assumed to be a point on M and to be a point closest to x, an approximation can be made with good accuracy as shown below:

$$x \approx y + \sum_{k=1}^m \mu_k S^k(x),$$

where each $\mu_k$ is an n-dimensional vector quantity, and the components are shown as $\mu_k=(\mu_k^1, \mu_k^2, \ldots, \mu_k^n)$, Since y is assumed to be a point on M, $S^k(y)=0$. Since the following is satisfied on the basis of the assumption $$y \approx x - \sum_k \mu_k S^k(x),$$

the following is obtained:

$$S^k(y) \approx S^k\left(x - \sum_{l=1}^{m} \mu_l S^l(x)\right) \approx 0. \quad (19)$$

When this is approximated by a first order Taylor expansion, the following is obtained:

$$0 \approx S^k(x) - <Grad_x S^k(x), \sum_{l=1}^{m} \mu_l S^l(x)>. \quad (20)$$

With the assistance of the quantity of equation (15), the following is obtained:

$$S^k(x) \approx \sum_{l=1}^{m} <F^k(x), \mu_l > S^l(x).$$

When the linear independence of the neighborhood system is considered, the following is obtained, $$<F^k(x),\mu_l> = \delta_{kl}. \quad (21)$$

When this equation is solved with respect to $\mu_k$, based on equation (15), the following is obtained:

$$\mu_k \approx \sum_{l=1}^{m} Q_{kl} F^l(x). \quad (22)$$

Therefore, when the projection of x onto M is performed at the point x within $R^n$ and in the neighborhood of M, the vector corresponding to the amount of change thereof is defined as follows:

$$Appr(x) = \sum_{l,k=1}^{m} Q_{kl}(x) F^k(x) S^l(x). \quad (23)$$

Next, as a property of an embedded manifold, the Riemannian geometrical properties of the admissible set M are described by using a well-known technique. As is well known in the discussion of integrability, a necessary and sufficient condition for the vector Y on M to become a tangent vector of M is $$(dS^k)_x(Y)=0 \text{ or } <Grad_x S^k, Y>. \quad (24)$$

When a vector Y on $R^n$ at a point x on M is given, for an arbitrary tangent vector $U \in T_x M$ at the point x, $V \in T_x M$, which satisfies the relation, $$<U,V>=<U,Y> \quad (25)$$

uniquely exists, and this can be written as:

$$V = Y - \sum_{k,l=1}^{m} Q_{kl} <F^l, Y> F^k \quad (26)$$

A projection V of the vector Y onto a tangent space $T_x M$ is written as $Proj_x Y$.

When tangent vector fields $U,V \in x(M)$ on M are given, the covariant derivative $\nabla_U V \in x(M)$ of V along the U direction is given as, $$\nabla_U V = Proj_x[U \cdot Grad_x V]. \quad (27)$$

When this is rewritten using the definition of $Proj_x$ of equation (26), the following is obtained:

$$\nabla_u V = U \cdot Grad_x V - \sum_{k,l=1}^{m} Q_{kl} <F^l, U \cdot Grad_x V> F^k. \quad (28)$$

Here, by performing U,Grad on the relation $<F^k, V>=0$ which is obtained due to the fact that V is a tangent vector field on M, the following relation is obtained, $$<F^k, U \cdot Grad_x V> = - <U \cdot Grad_x F^k, V> \quad (29)$$
$$= -Hess_x S^k(U,V).$$

With the aid of this relation, $$\nabla_U V = (U \cdot Grad)_x V - \Gamma(U,V), \quad (30)$$

$$\text{where } \Gamma(U,V) = \sum_{k,l=1}^{m} Q_{kl} Hess_x S^k(U,V) F^l. \quad (31)$$

Next, the parallel translation is described. The condition for the vector field V on M to be parallel along a smooth curve $\{\gamma(t)|t \in [0,1]\}$ is that the covariant derivative of V along the tangential direction of the curve at each point $\gamma(t)$ on the curve is 0, that is:

$$(\dot{\gamma}(t) \cdot Grad)_x V = \Gamma(\dot{\gamma}(t), V). \quad (32)$$

Here, by using $$(\dot{\gamma}(t) \cdot Grad)_x V = \frac{dV(t)}{dt}, \quad (33)$$

the parallel translation equation of the vector field V(t) on the well-known curve $\{\gamma(t)|t \in [0,1]\}$ on M becomes $$\frac{dV(t)}{dt} - \Gamma(\dot{\gamma}(t), V(t)) = 0. \quad (34)$$

The solution of the parallel translation equation with respect to the initial condition V(0)=G is given by equation, $$V(t) = G - t\Gamma(H,G) + o(t), \quad (35)$$

where $H = \dot{\gamma}(0)$.

The fact that the curve $\{\gamma(t)|t\in[0,1]\}$ on M is a geodesic line means that $\dot\gamma(t)$ satisfies the parallel translation equation. Therefore, the geodesic line equation becomes $$\frac{d^2\gamma(t)}{dt^2} - \Gamma(\dot\gamma(t), \dot\gamma(t)) = 0. \tag{36}$$

The solution of the geodesic line equation with respect to the initial condition $\gamma(0)=x_0$ is given on the basis of the following equation $$\gamma(t) = x_0 + tH - \frac{t^2}{2}\Gamma(H,H) + o(t^2), \tag{37}$$

where $H=\dot\gamma(0)$.

Next, an outline of the algorithm of Smith is described. In the first place, in general, the concept of the direction on a Riemannian manifold is not well defined. When a tangent vector at a particular point on a Riemannian manifold is defined and it is parallel-translated on a particular closed curve passing through that point, in general, the direction of the initial vector differs from the direction of the vector which has passed around along the closed curve. It is well known that the amount of change thereof depends on the scalar curvature within the adopted closed curve.

For this reason, the attempt that a conjugate gradient method is formed on a manifold cannot offer prospects that all the good properties of the conjugate gradient method with respect to a quadratic form are satisfied. However, (1) when a search operation is considered as embedding a curve (a one-dimensional submanifold) into M, the direction orthogonal to the tangent vector $\dot\gamma(t)$ is well defined. Therefore, the correction for a new search direction to become orthogonal to $\dot\gamma(t)$ is considered to be a useful and efficient calculation method.

(2) only when the energy function along the M can be sufficiently regarded as a quadratic form when a minimum value is sufficiently approached under constraints and in the neighborhood of the minimum value on the admissible manifold M, it can be expected that the conjugate gradient methods of Hestenes, Lanczos, and Stiefel work effectively and that the convergence can be more rapid.

Figure 7:
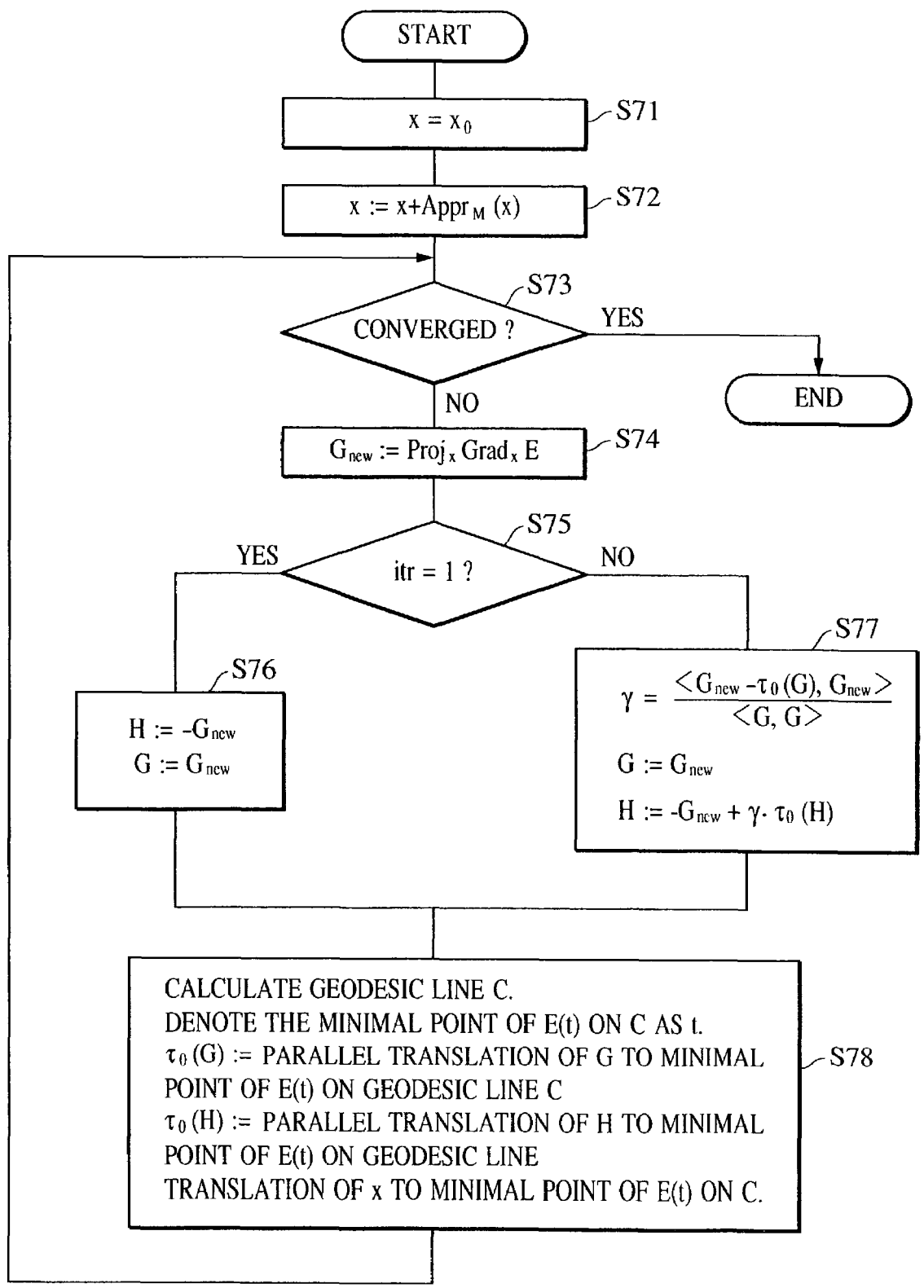
FIG. 7 is a flowchart showing a conventional procedure for determining a solution of an optimization problem with constraints.

Therefore, in a case where the energy integration is a quadratic form, it is a natural idea that the conjugate gradient method on a manifold is defined to become an algorithm similar to those of Hestenes, Lanczos, and Stiefel. In practice, in the case of a system in which a model of a physical phenomenon is formed, it is empirically known that, often, the energy function has such properties. Accordingly, the algorithm of Smith is described with reference to FIG. 7.

The algorithm of Smith:

In step S71, the initial position is set to $x=x_0$.

In step S72, if the point x does not exist on the admissible manifold M, the point x is moved onto the admissible manifold M.

In step S73, it is determined whether or not the energy is converged. It is set in advance that, at the first time, this becomes "NO".

In step S74, the following is calculated:

$$G_{new} := \text{Proj}_x \text{Grad}_x E. \tag{38}$$

In step S75, a determination is made as to the number of iterations. For the first iteration, the process proceeds to step S76, where $G:=G_{new}$ and $H:=-G_{new}$ are set.

In step S78, (1) A geodesic line C in the H direction is determined, and t at which E(t) becomes a minimum on C is determined;

(2) a vector G which is parallel-translated by t along the geodesic line is denoted as $\tau_0(G)$;

(3) a vector H which is parallel-translated by t along the geodesic line is denoted as $\tau_0(H)$; and (4) the point x is moved by t along the geodesic line.

Then, the process returns to step S73, where it is determined whether the energy has converged. When the amount of change of the energy is smaller than a desired value, it is determined that the energy has converged, and the processing is terminated. When it is determined that the energy has not converged, $G_{new}$ is calculated in step S74, and then a determination in step S75 is made. For the second and subsequent iterations, the process proceeds to step S77, where the following are calculated:

$$\gamma = \frac{<G_{new}-\tau_0(G), G_{new}>}{<G,G>}, \tag{39}$$

$$G := G_{new},$$

$$H := -G_{new} + \gamma \cdot \tau_0(H).$$

Thereafter, the process proceeds to step S78 again. The above-described steps are performed in accordance with the flowchart.

However, when numerical calculations are performed using the algorithm of Smith, due to numerical errors, $\tau_0(G)$ and $\tau_0(H)$ obtained as a result of parallel translation are no longer tangent vectors, and x is no longer a point on M. For this reason, approaching the admissible manifold M performed in step S72 must also be performed each time in step S78. To begin with, in the manner described above, this algorithm is not validated mathematically as a conjugate gradient method with respect to general constraints and the energy function, and accurately calculating parallel translation, etc., has no significant meaning.

On the other hand, the operations for $\tau_0(G)$, $\tau_0(H)$, etc., are calculations requiring cost in terms of computer use, and a long calculation time is required.

Therefore, in this embodiment, substitution by replacing the above operations with the second-order approximation described below is proposed. In the neighborhood of the minimum value on the admissible manifold M, when the energy function along M can be sufficiently regarded as a quadratic form, this approximation matches the exact calculation result. Therefore, it has a validity comparable to the algorithm of Smith, and the calculation time is substantially reduced.

A method of solving a problem according to this embodiment is now described with reference to FIG. 1. The algorithm of this embodiment goes through the calculation procedure shown below.

In step S1, the initial position is set as $x=x_0$.

In step S2, the following operation of bringing x close to M is performed:

$$x := x + \text{Appr}_M(x). \tag{40}$$

In step S3, it is determined whether the energy E has converged. Hereafter, steps S2 to S8 are performed until the energy E converges.

In step S4, a new tangent vector $G_{new}$ is calculated on the basis of the following:

$$G_{new} := \text{Proj}_x \text{Grad}_x E. \quad (41)$$

In step S5, the number of iterations is checked. For the first iteration, the process proceeds to step S6, where the tangent vector G is set as $G:=G_{new}$ and the searching-direction vector H is set as $H:=-G_{new}$.

Next, in step S8, (1) a curve C which is an approximate geodesic line is set as $$C := \left\{ x + tH - \frac{t^2}{2}\Gamma(H, H) \middle| t > 0 \right\},$$

and t at which E(t) reaches a minimum on C is determined.

(2) The tangent vector G which is approximately parallel-translated by t along the geodesic line is set as $$\tau(G) := \text{Proj}_x(G - t\Gamma(H, G)). \quad (42)$$

(3) The search vector H which is approximately parallel-translated by t along the geodesic line is set as:

$$\tau(H) := \text{Proj}_x(H - t\Gamma(H, H)) \quad (43)$$

(4) The point x is moved by t along the geodesic line:

$$x := x + tH - \frac{t^2}{2}\Gamma(H, H). \quad (44)$$

The process returns to step S2, where the point is moved onto the admissible manifold M, after which, in step S3, it is determined whether convergence has occurred. For this determination, for example, it is determined whether the energy difference is greater or smaller than a desired value. When it is determined that the energy has sufficiently converged, the program (subroutine or function) is terminated.

In step S5, $G_{new}$ is calculated, after which the determination in step S6 is made. For the second and subsequent iterations, the process proceeds to step S8, where the calculations of the following substitutions are performed:

$$\gamma = \frac{\langle G_{new} - \tau(G), G_{new} \rangle}{\langle G, G \rangle}, \quad (45)$$

$$G := G_{new},$$

$$H := -G_{new} + \gamma \cdot \tau(H),$$

and the process proceeds to step S8. This operation is performed until the energy converges.

Figure 5:
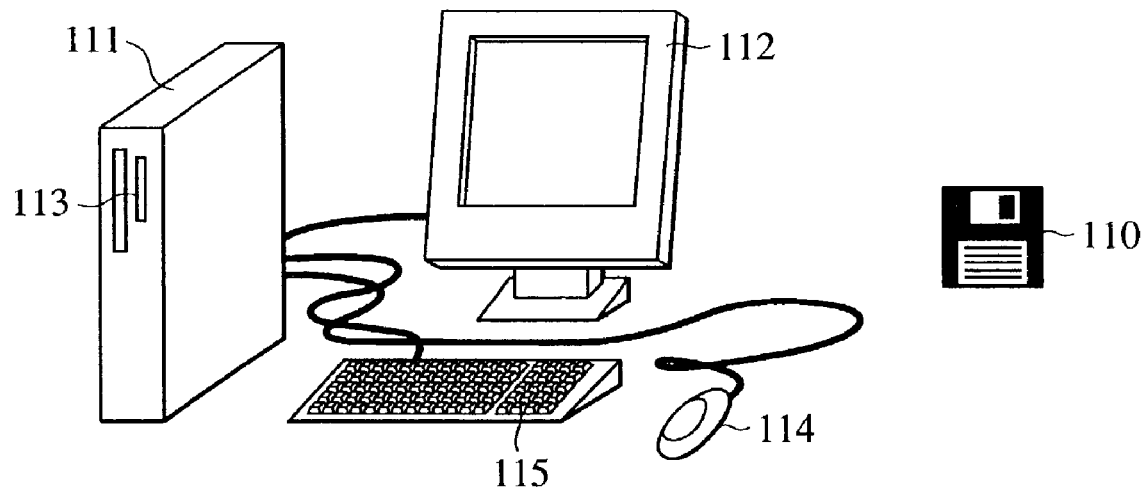
FIG. 5 shows the external construction of a computer which executes the optimization method according to the present invention.
Figure 6:
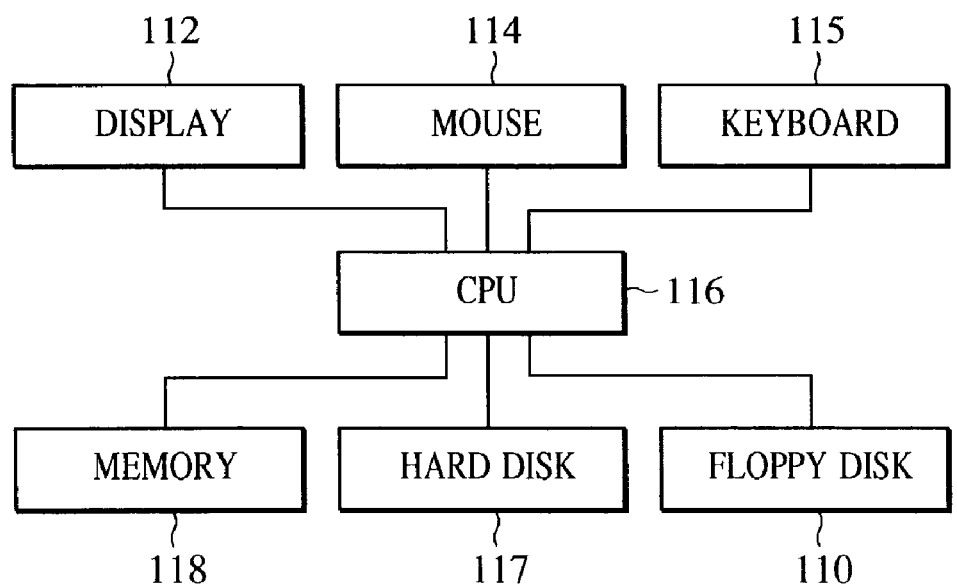
FIG. 6 is a block diagram of a computer which executes the optimization method according to the present invention.

Next, a description is given of the configuration of a computer for realizing the optimization method described with reference to the flowchart in FIG. 1. The calculation method of the embodiment is realized by a computer system comprising a computer main unit 111, a display 112, a keyboard 115, and a mouse 114, and a storage medium such as a floppy disk 110, as shown in FIGS. 5 and 6. Inside the computer main unit 111, a CPU 116, a hard disk 117, a memory 118, a floppy disk drive 113, etc., are disposed.

The computer loads, into the memory 118, an executable program for an optimization method in accordance with the algorithm of the present invention from a storage medium, such as the hard disk 117 or the floppy disk 110, allocates a necessary calculation area in the memory 118, and performs calculations, in accordance with the procedure corresponding to the flowchart in FIG. 1, on the energy function, a function representing constraints, and the initial position, which are input by an appropriate method such as being input from the keyboard 115 or being read from the floppy disk 110. The positions which provide the minimum value and maximum value of the obtained function are displayed in the form of numerical values or a graph on the display 112.

description is now given below on the basis of specific examples.

EXAMPLE 1

As Example 1, the following geometrical problem is considered. The space to be considered is an n-dimensional real-vector space $R^n$ ($e_i|i=1, \ldots, n$), and the standard orthogonal base is ($e_i|i=1, \ldots, n$), that is, $b_{ij} = \langle e_i, e_j \rangle = \delta(i, j=1, \ldots, n)$. The admissible set M is set as:

$$M = \left\{ (x^1, x^2, \ldots, x^n) \in R^n \middle| \sum_{i=1}^{n-1} (x^i)^2 + \left(x^n + \frac{1}{2}\right)^2 = 1, x^n = 0 \right\}. \quad (46)$$

Furthermore, the energy functional is set as:

$$E(x) = (x^1 - 2)^2 + \sum_{i=2}^{n} (x^i)^2. \quad (47)$$

In this case, as a conditional equation representing the constraints, the following may be used:

$$S^1(x) = \sum_{i=2}^{n} (x^i)^2 + \left(x^n + \frac{1}{2}\right)^2 - 1, \quad (48)$$

$$S^2(x) = x^n.$$

For the sake of convenience, here, when a dual basis of $e_i := b^{ij} e_j$ is introduced, the following are obtained:

$$F^1(x) = \sum_{i=2}^{n} 2x^i e^i + (2x^n + 1)e^n, \quad (49)$$

$$F^2(x) = e^n,$$

$$Q^{11}(x) = \sum_{i=2}^{n} 2(x^i)^2 + (2x^n + 1)^2,$$

$$Q^{12}(x) = Q^{21}(x) = (2x^n + 1),$$

$$Q^{22}(x) = 1.$$

The Hessian is also calculated as follows:

$$\text{Hess}_x S^1(U, V) = 2\delta_{ij} U^i V^j, \quad (50)$$

$$\text{Hess}_x S^2(U, V) = 0.$$

Figure 2:
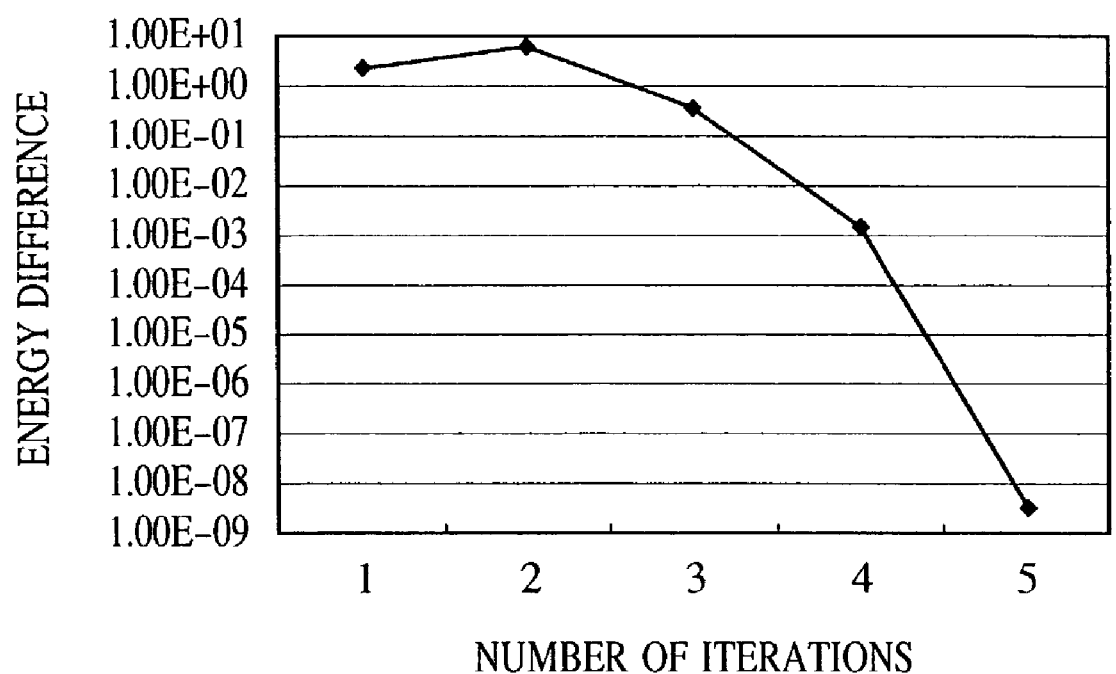
FIG. 2 shows convergence.

When calculations are performed in accordance with the algorithm of FIG. 1 by using these quantities, the energy converges as shown in FIG. 2. The vertical axis in FIG. 2 indicates a difference between the value of the energy function E(x) evaluated in step S3 in FIG. 1 and the value of the energy function E(x) evaluated after the processes of steps S3 to S8 are performed. The horizontal axis indicates the number of iterations. However, for the first iteration, the value of the energy function E(x) itself at the initial position is given. As can be seen from FIG. 2, the energy E(x) has converged.

EXAMPLE 2

Figure 3:
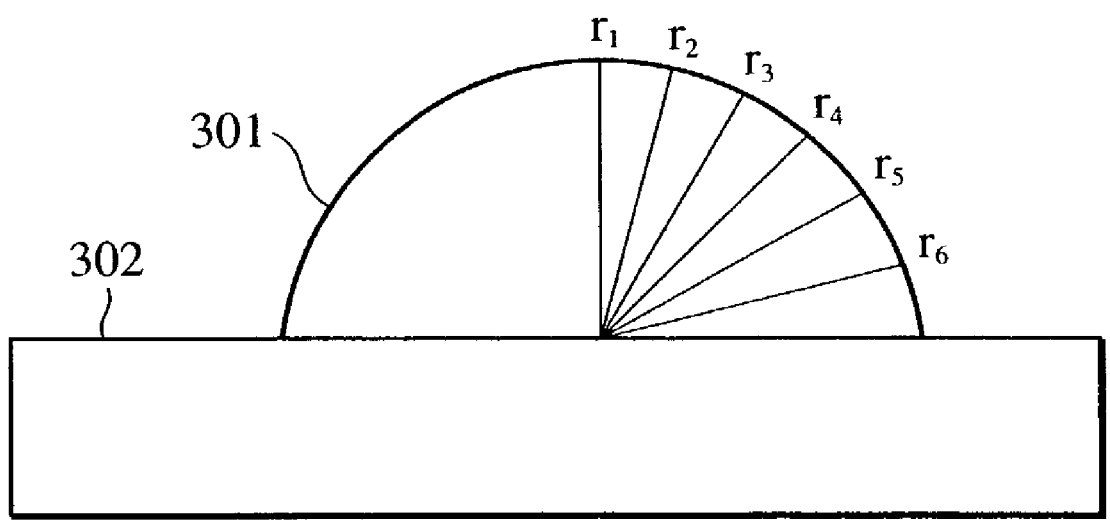
FIG. 3 shows droplets on a plane.

As Example 2, an optimization algorithm of the above-described embodiment is applied to the problem of the shape of droplets on a plane. FIG. 3 shows droplets on a plane. It is assumed that, as constraints, the volume of the droplets is fixed and the surface area is minimized. The droplets 301 are formed on a flat plate 302, as shown in FIG. 3. Rotational symmetry is assumed for the droplets 301, and furthermore, the droplets 301 are assumed to have the same topology as a hemispherical shape, and calculations are performed by using the radius, such as that shown in FIG. 3, as a parameter.

The constraints are such that the volume of the droplets is fixed, and an admissible manifold which satisfies the constraints is given on the basis of the following equation:

$$M=\{(r^1, r^2, \ldots, r^n) \in R^n | S(r)=0\}, \quad (51)$$

where $$S(r) = \sum_{i=1}^{n-1} s_i(r) h_i(r) - \frac{2}{3}\pi r_0^3. \quad (52)$$

However, by setting $$\theta_i = \frac{(i-1)\pi}{(n-1)2},$$

the following are set:

$$s_i(r) = \pi/3 (r_i^2 \sin^2\theta_i + r_i r_{i+1} \sin\theta_i \sin\theta_{i+1} + r_{i+1}^2 \sin^2\theta_{i+1}),$$

$$h_i(r) = r_i \cos\theta_i - r_{i+1} \cos\theta_{i+1}.$$

Furthermore, as an energy functional, the following may be used:

$$E(x) = \sum_{i=1}^{n-1} \pi(r_i \sin\theta_i + r_{i+1}\sin\theta_{i+1}) d_i - \pi r r_n^2 \cos\phi, \quad (53)$$

$$d_i = \sqrt{r_i^2 + r_{i+1}^2 - 2 r_i r_{i+1} \cos(\theta_i - \theta_{i+1})}.$$

At this time, as geometrical quantities for using the above-described algorithm, quantities such as those shown below are specifically determined. However, since there is one conditional equation, S(r) is regarded as being the same as $S^1(r)$.

$$F(r) = \sum_{i=2}^{n} \frac{\partial S(r)}{\partial r_i} e^i, \quad (54)$$

$$Q^{11}(r) = \sum_{i=2}^{n} \frac{\partial S(r)}{\partial r_i} \frac{\partial S(r)}{\partial r_i},$$

$$Q_{11}(r) = \left( \sum_{i=2}^{n} \frac{\partial S(r)}{\partial r_i} \frac{\partial S(r)}{\partial r_i} \right)^{-1},$$

$$\frac{\partial S(r)}{\partial r_i} = \alpha_i \left( \frac{\partial s_i}{\partial r_i} h_i + s_i \frac{\partial h_i}{\partial r_i} \right) + \beta_i \left( \frac{\partial s_{i-1}}{\partial r_i} h_{i-1} + s_{i-1} \frac{\partial h_{i-1}}{\partial r_i} \right),$$

$$\frac{\partial s_i}{\partial r_i} = \frac{\pi}{3}(2 r_i \sin^2\theta_i + r_{i+1} \sin\theta_i \sin\theta_{i+1}),$$

$$\frac{\partial s_{i-1}}{\partial r_i} = \frac{\pi}{3}(2 r_i \sin^2\theta_i + r_{i-1} \sin\theta_i \sin\theta_{i-1}),$$

$$\frac{\partial h_i}{\partial r_i} = \cos\theta_i, \quad \frac{\partial h_{i-1}}{\partial r_i} = -\cos\theta_i.$$

For example, the Hessian of S(r) is determined as shown below:

$$\text{Hess}_x s^1(U,V) = 2 s_{ij} U^i V^j, \quad (51)$$

where $$S_{ij} := \frac{\partial^2 S(r)}{\partial r_i \partial r_j} = \alpha_i \left( \frac{\partial^2 s_i}{\partial r_i \partial r_j} h_i + \frac{\partial s_i}{\partial r_i} \frac{\partial h_i}{\partial r_j} + \frac{\partial s_i}{\partial r_j} \frac{\partial h_i}{\partial r_i} \right) + \beta_i \left( \frac{\partial^2 s_{i-1}}{\partial r_i \partial r_j} h_{i-1} + \frac{\partial s_{i-1}}{\partial r_i} \frac{\partial h_{i-1}}{\partial r_j} + \frac{\partial s_{i-1}}{\partial r_j} \frac{\partial h_{i-1}}{\partial r_i} \right). \quad (56)$$

Furthermore, the individual terms are given on the basis of the following:

$$\frac{\partial^2 s_i}{\partial r_i \partial r_j} = \begin{cases} \frac{2\pi}{3} \sin^2\theta, & j=i \\ \frac{\pi}{3} \sin\theta_i \sin\theta_{i+1}, & j=i+1, \\ 0, & \text{others} \end{cases} \quad (57)$$

$$\frac{\partial h_i}{\partial r_j} = \begin{cases} \cos\theta, & j=i \\ -\cos\theta_{i+1}, & j=i+1, \\ 0, & \text{others} \end{cases}$$

$$\frac{\partial h_{i-1}}{\partial r_j} = \begin{cases} -\cos\theta, & j=i \\ \cos\theta_{i-1}, & j=i-1. \\ 0, & \text{others} \end{cases}$$

Similarly, regarding the energy functional, by rewriting the energy functional as follows:

$$E(x) = \sum_{i=1}^{n-1} g_i d_i - \pi r r_n^2 \cos\phi, \quad (58)$$

$$g_i(x) = \pi(r_i \sin\theta_i + r_{i+1}\sin\theta_{i+1}),$$

$$d_i \sqrt{r_i^2 + r_{i+1}^2 - 2 r_i r_{i+1} \cos(\theta_i - \theta_{i+1})}.$$

The directional derivative thereof, etc., are calculated as follows.

$$F(r) = \sum_{i=2}^{n} \frac{\partial S(r)}{\partial r_i} e^i, \quad (59)$$

-continued $$\frac{\partial E(r)}{\partial r_i} = \alpha_i \left( \frac{\partial g_i}{\partial r_i} d_i + g_i \frac{\partial d_i}{\partial r_i} \right) + \beta_i \left( \frac{\partial g_{i-1}}{\partial r_i} d_{i-1} + g_{i-1} \frac{\partial d_{i-1}}{\partial r_i} \right) - 2\pi r r_n \delta_{i,n} \cos\phi,$$

$$\frac{\partial d_i}{\partial r_i} = \frac{r_i - 2r_{i+1}\cos(\theta_i - \theta_{i+1})}{d_i},$$

$$\frac{\partial d_{i-1}}{\partial r_i} = \frac{r_i - 2r_{i-1}\cos(\theta_i - \theta_{i-1})}{d_{i-1}},$$

$$\frac{\partial g_i}{\partial r_i} = \pi \sin\theta_i, \quad \frac{\partial g_{i-1}}{\partial r_i} = \pi \sin\theta_i.$$

Similarly, the Hessian $\text{Hess}_x \, E(U,V) = 2e_{ij}U^iV^j$ of the energy functional can also be calculated as, $$e_{ij} := \frac{\partial^2 E(r)}{\partial r_i \partial r_j} = \alpha_i \left( \frac{\partial^2 g_i}{\partial r_i \partial r_j} d_i + \frac{\partial g_i}{\partial r_i} \frac{\partial d_i}{\partial r_j} + \frac{\partial g_i}{\partial r_j} \frac{\partial d_i}{\partial r_i} + g_i \frac{\partial^2 d_i}{\partial r_i \partial r_j} \right) + \beta_i \left( \frac{\partial^2 g_{i-1}}{\partial r_i \partial r_j} d_{i-1} + \frac{\partial g_{i-1}}{\partial r_i} \frac{\partial d_{i-1}}{\partial r_j} + \frac{\partial g_{i-1}}{\partial r_j} \frac{\partial d_{i-1}}{\partial r_i} + g_{i-1} \frac{\partial^2 d_{i-1}}{\partial r_i \partial r_j} \right) - 2\pi r r_n \delta_{i,n} \delta_{j,n} \cos\phi, \quad (60)$$

$$\frac{\partial^2 d_i}{\partial r_i \partial r_j} = \begin{cases} \dfrac{1}{d_i} - \dfrac{(r_i - 2r_{i+1}\cos(\theta_i - \theta_{i+1}))^2}{d_i^3}, & j = i \\ -\dfrac{2r_{i+1}\cos(\theta_i - \theta_{i+1})}{d_i} - \dfrac{(r_i - 2r_{i+1}\cos(\theta_i - \theta_{i+1}))(r_{i+1} - 2r_i\cos(\theta_i - \theta_{i+1}))}{d_i^3}, & j = i+1, \\ 0, & \text{others} \end{cases}$$

$$\frac{\partial^2 d_{i-1}}{\partial r_i \partial r_j} = \begin{cases} \dfrac{1}{d_{i-1}} - \dfrac{(r_i - 2r_{i-1}\cos(\theta_i - \theta_{i+1}))^2}{d_{i-1}^3}, & j = i \\ -\dfrac{2r_{i+1}\cos(\theta_i - \theta_{i-1})}{d_{i-1}} - \dfrac{(r_i - 2r_{i-1}\cos(\theta_i - \theta_{i-1}))(r_{i-1} - 2r_i\cos(\theta_i - \theta_{i-1}))}{d_i^3}, & j = i+1, \\ 0, & \text{others} \end{cases}$$

$$\frac{\partial^2 d_i}{\partial r_j} = \begin{cases} \dfrac{r_i - 2r_{i+1}\cos(\theta_i - \theta_{i+1})}{d_i}, & j = i \\ \dfrac{(r_{i+1} - 2r_i\cos(\theta_i - \theta_{i-1}))}{d_{i+1}}, & j = i+1, \\ 0, & \text{others} \end{cases}$$

$$\frac{\partial g_i}{\partial r_j} = \begin{cases} \pi\cos\theta, & j = i \\ \pi\sin\theta_{i+1}, & j = i+1, \\ 0, & \text{others} \end{cases}$$

Figure 4:
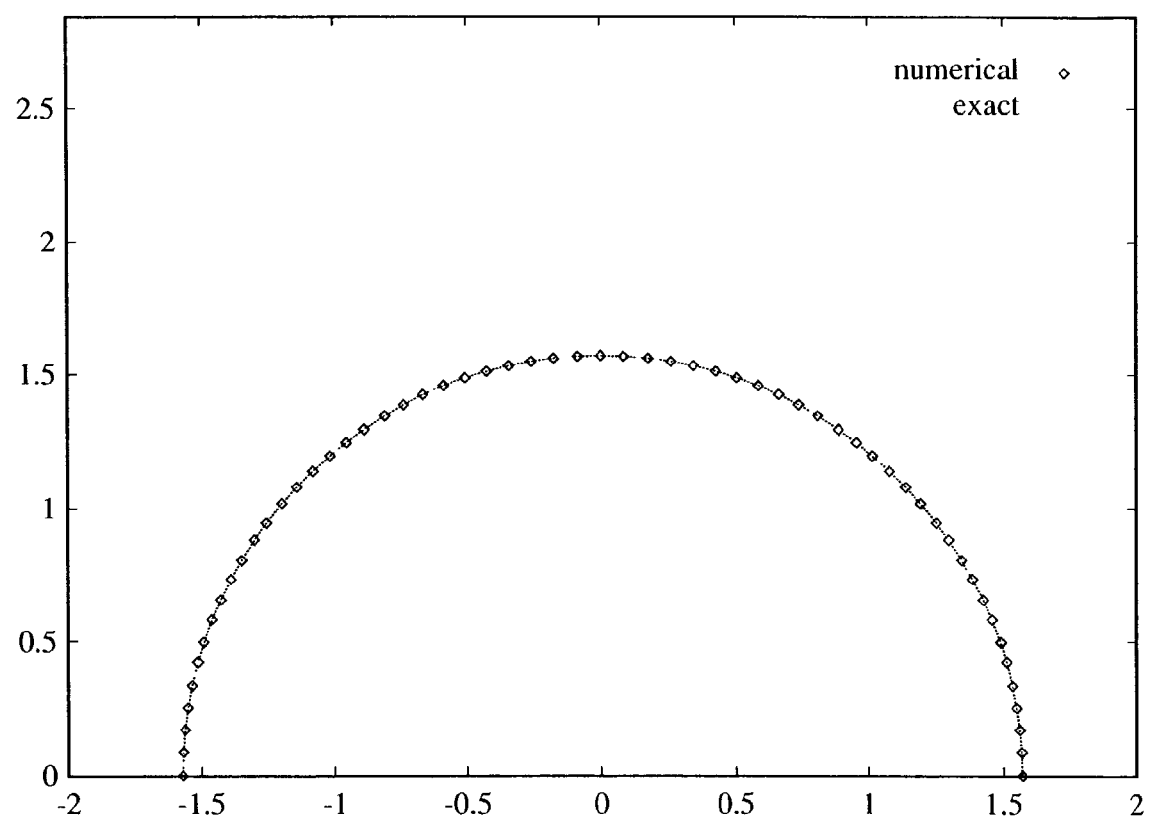
FIG. 4 shows the shape of droplets when converged.

When calculations are performed in accordance with the algorithm in FIG. 1 by using these quantities, the solution is converged as shown in FIG. 4. FIG. 4 shows the shape of droplets when the solution is converged after the calculations are performed, starting from an appropriate shape. It can be seen from FIG. 4 that the solution matches the exact solution. Furthermore, the problem of the shape of droplets on a plane is applied to a simulation of the shape of ink droplets on a paper and a simulated design of a head of an ink jet printer which jets out the ink droplets.

As described above, the algorithm of this embodiment can be contained as a subroutine program on a medium such as the floppy disk 110 or the hard disk 117 of FIG. 6. This makes it possible to easily perform simulation. However, as arguments of the subroutine, an energy function and a condition function are taken.

In the above-described embodiment, in an n-dimensional Euclidean space on a real number field, solution of a geodesic line equation is specifically constructed with second-order accuracy with respect to a case where constraints are specified by m independent equations, and an algorithm in which correction when the solution deviates from an admissible set is taken into consideration is proposed.

When the method of the above-described embodiment is used, the number of calculations becomes much smaller than that in which a geodesic line equation is solved exactly. On the other hand, when calculations are performed in accordance with an exact solution of the geodesic line equation, in practice, a process of recurring to an admissible set in a manner similar to that for a second-order approximation becomes necessary due to numerical errors. Therefore, in practice, calculations based on second-order approximation are not inferior to calculations using an exact solution: rather, they are considered to be advantageous by an amount corresponding to the smaller number of calculations.

Furthermore, in the algorithm described in the above-described embodiment, second-order function approximation is performed in the calculation of a geodesic line and in the calculation of the parallel translation of a vector. Even if one of them or both are substituted into a first-order approximation, the same algorithm can be constructed, and the same calculation results can be obtained.

The present invention may be applied to a system composed of a plurality of devices (for example, a computer main unit, an interface device, a display, etc.) and also to an apparatus composed of a single device as long as in which the functions of the above-described embodiment can be realized.

Furthermore, with a view to operating various devices so as to realize the functions of the above-described embodiment, an implementation in which program code of software which realizes the functions of the above-described embodiment is supplied to a computer within an apparatus or a system, which is connected to the various devices, the computer (or a CPU or an MPU) of that system or apparatus causes the various devices to operate in accordance with the supplied program is also within the scope of the present invention. In this case, the program code itself which is read from a storage medium realizes the functions of the above-described embodiment. The program code itself, and means for supplying the program code to the computer, for example, a storage medium having such program code stored therein, constitute the present invention.

For storage media for supplying such program code, for example, a floppy disk, a hard disk, an optical disk, a magneto-optical disk, a CD-ROM, a CD-R, magnetic tape, a non-volatile memory card, a ROM, etc., can be used.

Furthermore, when not only are the functions of the above-described embodiment realized by executing the program code read by the computer, but also the functions of the above-described embodiment are realized in cooperation with the OS (Operating System) running on the computer or other application software on the basis of the instructions of the program code, such program code is within the scope of the present invention.

In addition, a case in which program code read from a storage medium is written into a memory provided in a function expansion board inserted into a computer or a function expansion unit connected to a computer, after which a CPU provided in that function expansion board or in that function expansion unit executes a part or the entirety of the actual processing, and the functions of the above-described embodiment are realized by that processing is within the scope of the present invention.

When the present invention is to be applied to the storage medium, the storage medium may store program code corresponding to the flowchart described above.

Use of the optimization method which has thus been described makes it possible to determine a solution of an optimization problem with constraints with a simple calculation procedure.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A computer-implemented method performed by executing a computer-readable program stored in a computer-readable storage medium by a computer, for determining a minimum value of an optimization function under constraints given by equations, the method comprising the steps of:

a projection step of regarding a set of points which satisfy the constraints as a Riemannian manifold within a finite-dimensional real-vector space and of projecting a given point onto the Riemannian manifold;

a tangent vector updating/generating step of calculating a gradient of an optimization function as a point within the real-vector space and of updating/generating a tangent vector by projecting the obtained gradient vector onto a tangent space of the Riemannian manifold at the point on the Riemannian manifold projected in the projection step;

a searching-direction-vector generating step of generating a searching-direction vector indicating a search direction on the basis of the tangent vector;

an approximate geodesic line generating step of truncating an exponential map with respect to a geodesic line equation on the Riemannian manifold by a finite order and of generating an approximate geodesic line based on the searching-direction vector as a one-dimensional orbit obeying the truncated exponential map;

an approximate parallel-translation step of performing approximate parallel-translation on the tangent vector on the Riemannian manifold and on the approximate geodesic line by finite-order approximation of the exponential map regarding the parallel translation of the tangent vector; and a minimum point determining step of determining a minimum point on the approximate geodesic line, which minimizes the optimization function, along the approximate geodesic line, wherein a sequence of all the steps is iterated by using the minimum point in a latest iteration as the given point in a succeeding iteration wherein the minimum point determined is used to simulate the behavior of a material object in a model of a physical phenomenon.

2. An optimization method with constraints according to claim 1, wherein the point which is projected onto the Riemannian manifold in the projection step after the sequence of all the steps is iteratively performed a finite number of times is a point at which a minimum value to be determined is given.

3. An optimization method with constraints according to claim 2, further comprising a convergence determination step of determining convergence of the optimization function at the point which is made to approach each time the point is projected onto manifold in the projection step, wherein, when it is determined that the optimization function has converged in the convergence determination step, the projected point is assumed to be a point at which a minimum value is given.

4. An optimization method with constraints according to claim 1, wherein, in the searching-direction-vector generating step, for a first iteration, with respect to the tangent vector G obtained in the tangent vector updating/generating step, the searching-direction vector H is generated on the basis of H=−G.

5. An optimization method with constraints according to claim 1, wherein, in the searching-direction-vector generating step, for the second and subsequent iterations, when the previous tangent vector is denoted as G, the previous searching-direction vector is denoted as H, a vector obtained by performing approximate parallel-translation on the tangent vector G in the approximate parallel-translation step is denoted as t(G), a vector obtained by performing approximate parallel-translation on the searching-direction vector H is denoted as t(H), and a tangent vector which is updated in the tangent vector updating/generating step is denoted as G', a new searching-direction vector H' is generated on the basis of the following:

$$H' := -G' + \frac{<G' - \tau(G), G'>}{<G, G>} \cdot \tau(H).$$

6. An optimization method with constraints according to claim 1, wherein, in the approximate parallel-translation step, the finite-order approximation of an exponential map regarding parallel translation is a first-order approximation.

7. An optimization method with constraints according to claim 1, wherein, in the approximate geodesic line generating step, the finite-order approximation of an exponential map regarding a geodesic line equation is a second-order approximation.

8. An apparatus for determining a minimum value of an optimization function under constraints given by equations, the apparatus comprising:

projection means for regarding a set of points which satisfy the constraints as a Riemannian manifold within a finite-dimensional real-vector space and of projecting a given point onto the Riemannian manifold;

tangent vector updating/generating means for calculating a gradient of an optimization function as a point within the real-vector space and of updating/generating a tangent vector by projecting the obtained gradient vector onto a tangent space of the Riemannian manifold at the point on the Riemannian manifold projected by said projection means;

searching-direction-vector generating means for generating a searching-direction vector indicating a search direction on the basis of the tangent vector;

approximate geodesic line generating means for truncating an exponential map with respect to a geodesic line equation on the Riemannian manifold by a finite order and of generating an approximate geodesic line based on the searching-direction vector as a one-dimensional orbit obeying the truncated exponential map;

approximate parallel-translation means for performing approximate parallel-translation on the tangent vector on the Riemannian manifold and on the approximate geodesic line by finite-order approximation of the exponential map regarding the parallel translation of the tangent vector; and minimum point determining means for determining a minimum point on the approximate geodesic line, which minimizes the optimization function, along the approximate geodesic line, wherein a sequence of operations by all said means is iterated by using the minimum point in a latest iteration as the given point in a succeeding iteration wherein the minimum point determined is used to simulate the behavior of a material object in a model of a physical phenomenon.

9. A computer-readable program stored in a computer-readable storage medium, for determining a minimum value of an optimization function under constraints given by equations, the program comprising code for causing the computer to perform:

a projection step of regarding a set of points which satisfy the constraints as a Riemannian manifold within a finite-dimensional real-vector space and of projecting a given point onto the Riemannian manifold, a tangent vector updating/generating step of calculating a gradient of an optimization function as a point within the real-vector space and of updating/generating a tangent vector by projecting the obtained gradient vector onto a tangent space of the Riemannian manifold at the point on the Riemannian manifold projected in the projection step;

a searching-direction-vector generating step of generating a searching-direction vector indicating a search direction on the basis of the tangent vector;

an approximate geodesic line generating step of truncating an exponential map with respect to a geodesic line equation for a tangent vector on the Riemannian manifold by a finite order and of generating an approximate geodesic line based on the searching-direction vector as a one-dimensional orbit obeying the truncated exponential map; and an approximate parallel-translation step of performing approximate parallel-translation on the tangent vector on the Riemannian manifold and on the approximate geodesic line by finite-order approximation of the exponential map regarding the parallel translation of the tangent vector;

a minimum point determining step of determining a minimum point on the approximate geodesic line, which minimizes the optimization function, along the approximate geodesic line, wherein a sequence of all the steps is iterated by using the minimum point in a latest iteration as the given point in a succeeding iteration wherein the minimum point determined is used to simulate the behavior of a material object in a model of a physical phenomenon.

10. A storage medium having stored therein the program according to claim 9.

* * * * *

UNITED STATES PATENT AND TRADEMARK OFFICE
CERTIFICATE OF CORRECTION

PATENT NO. : 7,197,486 B2  
APPLICATION NO. : 10/192158  
DATED : March 27, 2007  
INVENTOR(S) : Akira Asai et al.

It is certified that error appears in the above-identified patent and that said Letters Patent is hereby corrected as shown below:

ON COVER PAGE AT (56) OTHER PUBLICATIONS

After, "The Geometry ... Constraints,": "A" should read --A.--; and "al" should read --al.--.
After, "Dehaene Jeroen et al.,": "Oprimization" should read --Optimization--.

COLUMN 2

Line 32, "The" should read --("The--.

COLUMN 5

Line 28, "regard the" should read --regards the--; and
Line 33, "$C^{28}$-class" should read --$C^{\infty}$-class--.

COLUMN 6

Line 3, "f$\epsilon$ $C^{28}(R^n)$" should read --f $\epsilon$ $CP^{\infty}(R^n)$ --; and
Line 32, "$Z=Z^i e^i$" should read --$Z=Z^i e_i$--.

COLUMN 8

Line 24, "U,Grad" should read --U·Grad--.

COLUMN 12

Line 14, "description" should read --A description--;
Line 21, "$e_{i|i=1}$," should read --$e_i | i = 1$,--; and
Line 48, "$e_i := b^{ij} e_j$" should read --$e^i := b^{ij} e_j$ --.

COLUMN 13

Line 42, "$s_i(r) = \pi/3(r_i^2 \sin^2 \theta_i + r_i r_{i+1} \sin \theta_i \sin \theta_{I+1} + r_{i+1}^2 \sin^2 \theta_{i+1})$," should read
--$s_i(r) = \pi/3(r_i^2 \sin^2 \theta_i + r_i r_{i+1} \sin \theta_i \sin \theta_{i+1} + r_{i+1}^2 \sin^2 \theta_{i+1})$,--; and
Line 45, "$h_1(r) = r_i \cos \theta_i - r_{i+1} \cos \theta_{i+1}$." should read --$h_i(r) = r_i \cos \theta_i - r_{i+1} \cos \theta_{i+1}$.--.

COLUMN 14

Line 19 "(51)" should read --(55)--.

UNITED STATES PATENT AND TRADEMARK OFFICE
CERTIFICATE OF CORRECTION

PATENT NO. : 7,197,486 B2
APPLICATION NO. : 10/192158
DATED : March 27, 2007
INVENTOR(S) : Akira Asai et al.

It is certified that error appears in the above-identified patent and that said Letters Patent is hereby corrected as shown below:

COLUMN 15

Line 30,
$$\text{``} \frac{\partial^2 d_{i-1}}{\partial r_i \partial r_j} = \begin{cases} \frac{1}{d_{i-1}} - \frac{(r_i - 2r_{i-1}\cos(\theta_i - \theta_{i+1}))^2}{d_{i-1}^3} & j = 1 \\ -\frac{2r_{i+1}\cos(\theta_i - \theta_{i-1})}{d_{i-1}} - \frac{(r_i - 2r_{i-1}\cos(\theta_i - \theta_{i-1}))(r_{i+1} - 2r_i\cos(\theta_i - \theta_{i-1}))}{d_i^3}, & j = i+1 \\ 0, & \text{others} \end{cases} \text{''}$$

should read $$-- \frac{\partial^2 d_{i-1}}{\partial r_i \partial r_j} = \begin{cases} \frac{1}{d_{i-1}} - \frac{(r_i - 2r_{i-1}\cos(\theta_i - \theta_{i-1}))^2}{d_{i-1}^3} & j = 1 \\ -\frac{2r_{i+1}\cos(\theta_i - \theta_{i-1})}{d_{i-1}} - \frac{(r_i - 2r_{i-1}\cos(\theta_i - \theta_{i-1}))(r_{i+1} - 2r_i\cos(\theta_i - \theta_{i-1}))}{d_i^3}, & j = i+1 \\ 0, & \text{others} \end{cases} --$$

COLUMN 18

Line 16, "iteration" should read --iteration,--; and
Line 30, "onto" should read --onto the Reimannian--.

COLUMN 19

Line 39, "iteration" should read --iteration,--.

UNITED STATES PATENT AND TRADEMARK OFFICE
CERTIFICATE OF CORRECTION

PATENT NO. : 7,197,486 B2
APPLICATION NO. : 10/192158
DATED : March 27, 2007
INVENTOR(S) : Akira Asai et al.

It is certified that error appears in the above-identified patent and that said Letters Patent is hereby corrected as shown below:

COLUMN 20

Line 7, "manifold" should read --manifold;--;
Line 24, "and" should be deleted;
Line 30, "vector;" should read --vector; and--; and
Line 37, "iteration" should read --iteration,--.

Signed and Sealed this

Eleventh Day of December, 2007

JON W. DUDAS
*Director of the United States Patent and Trademark Office*